Aug. 9, 1927.
C. I. WARE
SPRING
Filed Dec. 26, 1925
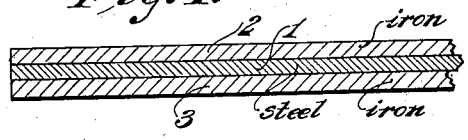
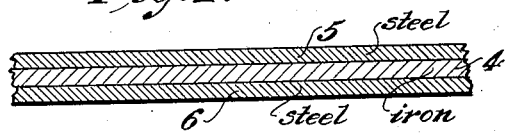
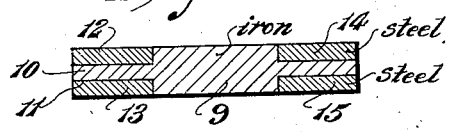
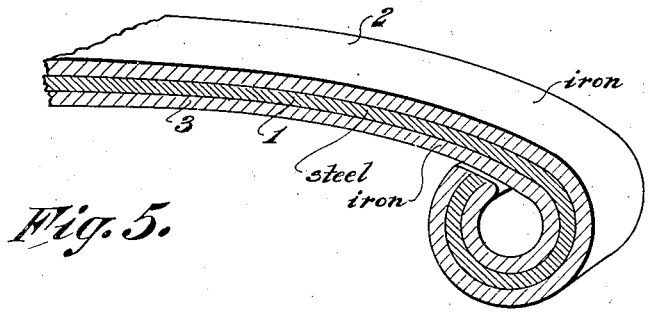
INVENTOR,
Charles I. Ware,
BY
Harry W. Bourn
ATTORNEY.

Patented Aug. 9, 1927.

1,638,516

UNITED STATES PATENT OFFICE.

CHARLES I. WARE, OF HOLYOKE, MASSACHUSETTS, ASSIGNOR OF ONE-HALF TO FRED E. MAXFIELD, OF HOLYOKE, MASSACHUSETTS.

SPRING.

Application filed December 26, 1925. Serial No. 77,864.

This invention relates to improvements in springs for use on motor vehicles. An object of the invention is to so construct a spring that it will be free from breakage when subjected to rough usage. It is a well known fact that the usual motor vehicle spring often breaks as a result of the crystallization of the metal which results from continuous vibration due to the shocks imparted thereto from the roadway. The present invention, broadly comprises a leaf spring unit which is composed of layers of wrought or malleable iron and low grade spring steel which are forged together into substantially an integral or solid mass and afterwards tempered to a suitable degree of elasticity. The fibres of the malleable iron during such forging will be intimately associated with or attached to the steel layer. This construction effectually serves to prevent the breakage of the steel layer, since the layer of wrought iron being of softer material than the layer of steel absorbs more or less of the sudden vibratory shocks. This spring construction would also prevent the vehicle from rebounding too suddenly, and, instead of a sharp blow being imparted to the vehicle it would result in a more or less even vibration. The present invention is capable of different forms or modifications as will be described.

Referring to the drawings:

Fig. 1 shows a sectional view of one leaf or unit of a spring having an upper and lower layer of iron and an interposed layer of steel.

Fig. 2 is a view similar to Fig. 1 but with the layers of iron and steel reversed.

Fig. 3 shows a leaf or unit of a spring made up with two layers, one being of iron and the other of steel.

Fig. 4 is a modification in which the center part of the spring unit is made of one thickness while the edge portions are reduced in thickness with strips of steel on the reduced edges.

Fig. 5 illustrates one of the leaves or unit layers in which an eye is formed.

Referring to the drawings in detail:

1 designates a layer of low grade steel preferably one that is capable of being mildly tempered. 2 and 3 are layers of malleable or soft iron which are placed on the opposite surfaces of the strip of steel. The spring unit is next heated to a welding temperature and subjected to a thorough forging process, whereby the layer of steel and the two layers of iron are reduced to substantially a single one piece solid or integral mass. The next step in the operation is the tempering of the steel of the spring unit. It should be understood that the iron will not be tempered when the steel is tempered.

Referring to Fig. 2 the inner layer 4 of the spring unit is iron while the two outer layers 5 and 6 are steel. The same process of forging the layers together into a one piece or integral unit is carried out in this modification.

Fig. 3 shows a spring unit in which one of the parts is a single layer of iron indicated at 7, and a single layer of steel indicated at 8. These two layers are then forged as before.

In Fig. 4 the center wrought iron portion of the spring is of greater thickness than its opposite side edges which are reduced in thickness as shown at 10 and 11 and on these reduced portions there are placed the strips of steel 12, 13, 14, and 15. In Fig. 4 the iron center part 9 is of the same thickness as the combined thickness of the strips and the reduced portions. The whole mass after being assembled is then forged into a single or integral mass and then tempered.

Fig. 5 is a view similar to Fig. 1 but showing an eye for receiving the shackle bolt in which the inner layer is of steel and the two layers of iron are carried around in substantially a circle. By combining a strip of steel with a strip or strips of iron the entire mass is subjected to the same vibrations and with very much less liability of breakage of the steel part of the spring, and, at the same time the required elasticity will be obtained. It is to be understood that in the forging process that the fibres of the layers of wrought or soft iron will be embedded in or form an integral part of the layer of steel which go to make up the leaf or unit of the spring. By the term forging it is understood to imply that the layers of the spring units are sufficiently heated to permit them to be welded together when subjected to a hammering or rolling process in order to form the integral or spring unit. The process of forming my integral leaf spring unit is as follows: A piece of malleable iron and two pieces of mild steel, or, two pieces of malleable iron and one piece of mild steel, or a single piece of malleable iron and mild steel, depending upon the spring unit that is to be made as shown in Figs. 2, 3, or 5 are placed in a welding furnace side by side and separately heated. Next, the individual pieces of malleable iron and mild steel are removed from the welding furnace and a welding flux is sprinkled on each piece, next, the individual pieces are built up, or placed one on the other, to form the unit. This unit is then put back into the furnace and heated to a welding temperature, next the unit is removed from the furnace when it is subjected to trip hammer blows forming what may be termed a billet. The individual layers of this billet are now welded together by the trip hammer operation. This billet is now returned to the furnace and heated to a rolling temperature. The billet is then passed through rolls which brings the same down to the correct size; next the whole mass is tempered. It is understood that the malleable iron does not become tempered. It is also to be understood that the temperatures employed are not high enough to burn the metal at any time. It will therefore be seen that the fibres of malleable iron and mild steel are intimately united by this process to form an integral spring unit.

What I claim is:

1. As an article of manufacture, a unit for a leaf spring comprising an integral mass of layers of iron and steel.

2. A spring having an inner core member of tempered material and outer layers of untempered material, the said layers being forged together into a solid mass.

3. A spring comprising layers of elastic and non-elastic material, intimately connected into an integral mass by forging.

4. A leaf for a layer spring consisting of parts of elastic and non-elastic material, the parts being intimately connected together to form a one piece member so that the layers will constitute a unit, the mass then being suitably tempered to the required degree of elasticity.

5. A spring comprising an elastic and non-elastic portion which is forged into an integral mass in order to cause the fibres of the non-elastic portion to be intimately united with the elastic portion, whereby the non-elastic portions will absorb the vibrations imparted to the spring and prevent breakage.

CHARLES I. WARE.